Sept. 29, 1953     R. C. PURKHISER     2,653,834
INSULATED PIPE UNION
Filed Sept. 21, 1950

INVENTOR.
ROY C. PURKHISER
BY
ATTORNEY

Patented Sept. 29, 1953

2,653,834

UNITED STATES PATENT OFFICE 2,653,834

INSULATED PIPE UNION

Roy C. Purkhiser, Cleveland, Ohio

Application September 21, 1950, Serial No. 186,000

5 Claims. (Cl. 285—17)

This invention relates in general to pipe unions and has for one of its primary objects to provide an improved pipe union assembly that is simple in construction and assembly, inexpensive in construction and universal in application.

Another object is to provide such an improved pipe union that will be leak-proof and insure against galvanic or electrolytic action, regardless of the material used in the pipes or the fluid conveyed therein.

A further object is to provide such an improved pipe union that will be leak-proof and insure against galvanic or electrolytic action even when the union effects a connection between ferrous and non-ferrous pipes.

A further object is to provide such a pipe union, that in addition to protection against fluid leakage and galvanic action, is provided with means for positioning the sealing and insulating gasket and for self-alignment in assembly to assist assembly by the usual securing means.

Figure 1:
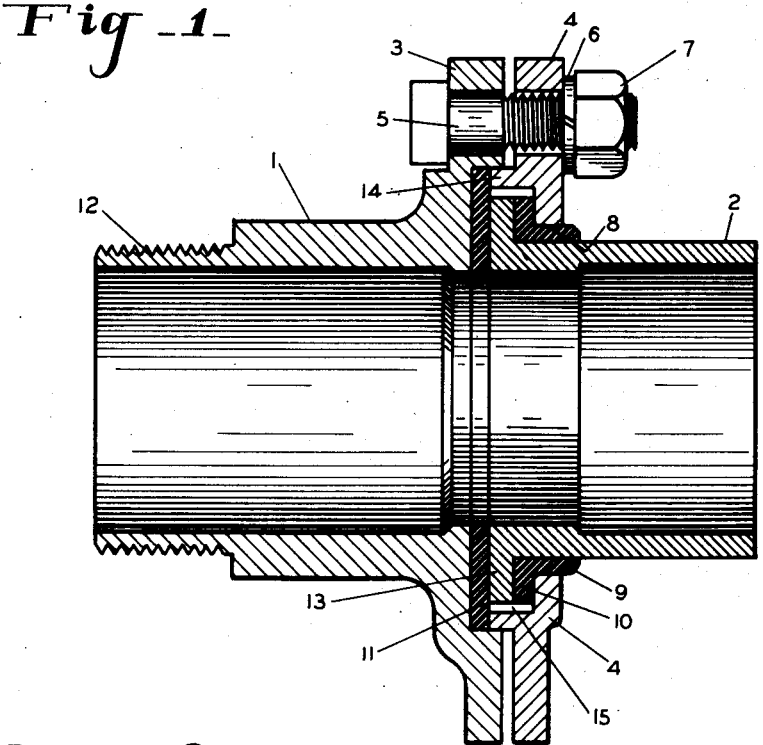
Figure 2:
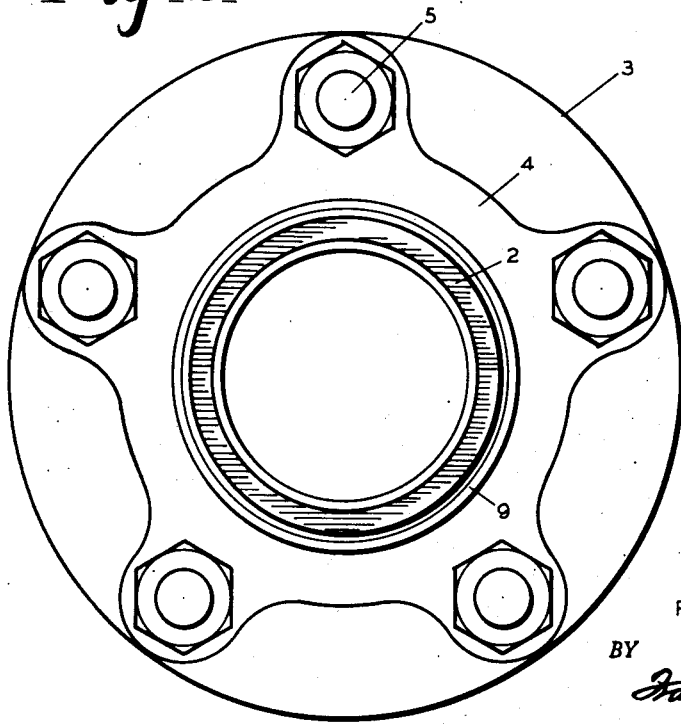

With the foregoing and other objects in view, the invention resides in the combination of parts and in the details of construction hereinafter set forth in the following specification and appended claims certain embodiments thereof being illustrated in the accompanying drawings, in which:

Figure 1 is a view in longitudinal section taken through the pipe union assembly; and Figure 2 is an end view taken at the right hand end of the union shown in Figure 1.

Referring more particularly to the drawings, the member of the union indicated at 1 may represent a member arranged for connection with a standard ferrous pipe or pipe fitting. It may, or may not be galvanized, or otherwise treated, for protection against corrosion.

The member of the union indicated at 2 may represent a sleeve of brass, or other non-ferrous material, adapted for solder or other joint connection with tubing of material, such as copper, or which may be threaded, if desired, to receive pipe of non-ferrous material, such as copper or brass, or other material.

It is to be understood that member 1 may be of ferrous material and may by means of threading 12, either external or internal be connected directly to a tank or boiler or may be a component part of a plumbing, heating or industrial piping system.

One of the major problems presented is the provision of a connection between member 1 and sleeve 2 that will insure against fluid leakage and atmospheric corrosion and, at the same time, insure against galvanic action, regardless of the similar, or dissimilar metallic characteristics of member 1 and sleeve 2.

I propose to effectively solve this problem in the following manner. As is usual practice, member 1, which may be of iron, steel or other special purpose metal, has a circular flange 3 provided with the usual bolt holes for attachment purposes.

I also employ a separate retaining collar 4, preferably of metallic likeness to that of member 1, and not that of sleeve 2. This retaining collar 4 is also provided with bolt holes, to be aligned with those of flange 3, to receive bolts 5, lock washers 6 and tightening nuts 7 or suitable screws for manual assembly and disassembly.

Between the inner extremity 8 of retaining collar 4 and sleeve 2, I propose to interpose a circular bushing 9 having a radially outwardly extending flange 10. This bushing is preferably of a material having high electrical insulation characteristics.

The flanged end of member 1 and a portion of its flange is provided with a circular recess to receive and position a gasket 11, preferably of high fluid sealing characteristics and of high dielectric strength. The depth of this recess is greater than the thickness of gasket 11. Sleeve 2 has a circular end flange 13, which in assembly is clamped between bushing 10 and gasket 11.

For purposes of ease of assembly and of accuracy of alignment the retaining collar 4 is provided with a narrow circular rib 14, of slightly less outside diameter than the diameter of the recess in the flange end of member 1. This forms an easy and efficient means of self-alignment in the assembly of the members of the union before the tightening clamping action effected by the bolts and nuts.

Moreover, the retaining collar 4 and its rib 14 are of such dimensions that in assembled position an appreciable dielectric air gap is provided annularly between rib 14 and the peripheral surface of flange 13.

The actual bolt and nut securing connection is between member 1 and its flange 3 with retaining collar 4 which are of like metallic material, such as ferrous metal. The important fact, however, is that the non-ferrous sleeve 2 is effectively electrically insulated from the ferrous collar 4, as well as from the ferrous member 1 and their bolt and nut connections. This is effectively provided for by gasket 11, bushing 9 with flange and the air gap 15.

Thus, it will be seen that I have provided an effective and commercially economical union for connecting standard sizes of copper or other non-ferrous tubing with standard sizes of black or galvanized pipe or pipe fittings. I have also provided for connecting by means of a flange union, relatively large sizes of copper tubing to storage tanks, boilers or other iron or steel equipment used in plumbing, heating and industrial piping systems. I have insured against galvanic action, which is a serious cause of disintegration of the ferrous members when copper tubing is connected in direct contact with galvanized or black steel or iron members of a piping system. One end of the union may be made of brass or other suitable non-ferrous material. The other end may be made of iron or steel which may be galvanized or protected from corrosion by other means or may be used in an unprotected condition.

The brass end is secured to the ferrous end by a retaining collar which is securely bolted to the ferrous end. Complete electrical insulation between the brass end and the other members of the union is assured by a flanged bushing of electrical fibre or other insulating material placed between the brass end and the retaining collar and by a gasket having high electrical insulating qualities between the base of the brass end and the adjacent face of the ferrous end of the union.

I have provided for correct self-aligning of the parts with respect to each other. This arrangement operates independently of the bolts, the main function of which is to prevent axial displacement of the parts. The retaining collar is finished with a projecting flange on the face which is adjacent to the face of the ferrous end of the union. A recess is provided in the face of the ferrous member of the union into which the retaining collar flange fits when the elements are assembled.

The retaining collar flange also compresses the gasket which is located in the recess in the face of the ferrous member of the union and seals the air gap against outside moisture, or any other material which might reduce the insulating efficiency of the union.

The union as shown is arranged for solder joint connection of the brass end with standard copper tubing and for threaded connection with standard pipe fittings by the ferrous end of the union. The brass end may be finished with male or female threads for connection with threaded pipe or pipe fittings where required. It may be finished to receive a copper tube of a smaller or larger nominal size than the pipe size of the ferrous member of the union. The ferrous end may be finished with female thread for use where conditions require this arrangement.

This pipe union is especially suitable for connecting pipe sections of relatively large sizes where the well known advantages of flange type connections are required. It may also be used for connecting smaller sizes which may be considered one inch pipe size and smaller where special conditions require its use.

For purpose of terminology in the following appended claims, and with particular reference to Figure 1, the right hand faces of flange 3 and the sealing gasket 11, as well as the left hand faces of flange 4, rib 14, flange 13, bushing flange 10 and the radial rim portion 4' of flange 4, are to be considered as front faces of their respective members.

I claim:

1. A pipe union comprising in combination a first pipe and a second pipe, each of said pipes having an end flange which is adapted to be opposed to the other when in assembled position in said union, a retaining collar for releasably connecting said two pipes together, said collar being adapted to surround said second pipe in radial spaced relation, securing and tightening means for releasably securing said collar to the end flange of said first pipe, the flanged end of said first pipe having an axial recess in its front face, a sealing and insulating gasket carried in said recess, said gasket being interposed between the opposed flange faces of said pipes for sealing against leakage and for preventing electrical contact between said first and second pipes, said collar having an inner radial rim, a dielectric bushing preformed to have an axial portion and a radial flange, respectively interposed annularly between said second pipe and the radial rim of said retaining collar, and also between the radial rim of said collar and the adjacent rear surface of the flange of said second pipe, said retaining collar having a circular end rib on its front face opposed to front face of the flange of said first pipe, the outside diameter of said rib being smaller than the inside diameter of said recess in the end of the first pipe so as to provide for sealing engagement of the rib of said collar with said gasket upon the tightening said securing and tightening means for the purpose of sealing against leakage from the interior of said pipes, the peripheral surfaces of the flanges of said second pipe and said bushing and the inner surfaces of said rib being annularly spaced to provide a dielectric air gap therebetween.

2. A pipe union comprising in combination a first pipe and a second pipe, each of said pipes having an end flange which is adapted to be opposed to the other when in assembled position in said union, a retaining collar for releasably connecting said two pipes together, said collar being adapted to surround said second pipe in radial spaced relation, securing and tightening means for releasably securing said collar to the end flange of said first pipe, the flanged end of said first pipe having an axial recess in its front face, a sealing and insulating gasket carried in said recess, said gasket being interposed between the opposed flange faces of said pipes for sealing against leakage and for preventing electrical contact between said first and second pipes, said collar having an inner radial rim, a dielectric bushing preformed to have an axial portion and a radial flange, respectively interposed annularly between said second pipe and the radial rim of said retaining collar, and also between the radial rim of said collar and the adjacent rear surface of the flange of said second pipe, said retaining collar having a circular end rib on its front face opposed to front face of the flange of said first pipe, the outside diameter of said rib being smaller than the inside diameter of said recess in the end of the first pipe so as to provide for sliding engagement and alignment between the rib of said collar and said first pipe independently of said securing and tightening means and to provide for engagement of said gasket by the rib of said collar upon tightening of said securing and tightening means for the purpose of sealing against leakage from the interior of said pipes, and the peripheral surfaces of the flanges of said second pipe and said bushing and the inner surface of said rib being annularly spaced to provide a dielectric air gap therebetween.

3. A pipe union comprising in combination a first pipe and a second pipe, each of said pipes having an end flange which is adapted to be opposed to the other when in assembled position in said union, a retaining collar for releasably connecting said two pipes together, said collar being adapted to surround said second pipe in radial spaced relation and provided with securing and tightening means for releasably securing said collar to the end flange of said first pipe, the flanged end of said first pipe having an axial recess in its front face, a sealing and insulating gasket carried in said recess, the radial width of said recess being such as to snugly receive said gasket so as to position said gasket therein, the axial depth of said recess being substantially greater than the thickness of the gasket, said gasket being interposed between the opposed flange faces of said pipes for sealing against leakage and for preventing electrical contact between said first and second pipes, said collar having an inner radial rim, a dielectric bushing preformed to have an axial portion and a radial flange, respectively interposed annularly between said second pipe and the radial rim of said retaining collar, and also between the radial rim of said collar and the adjacent rear surface of the flange of said second pipe, said retaining collar having a circular end rib on its front face opposed to front face of the flange of said first pipe, the outside diameter of said rib being smaller than the inside diameter of said recess in the end of the first pipe so as to provide for engagement of said gasket by the rib of said collar upon tightening said securing and tightening means for the purpose of sealing against leakage from the interior of said pipes, the peripheral surfaces of the flanges of said second pipe and said bushing and the inner surface of said rib being annularly spaced to provide a dielectric air gap therebetween.

4. A pipe union comprising in combination a first pipe and a second pipe, each of said pipes having an end flange which is adapted to be opposed to the other when in assembled position in said union, a retaining collar for releasably connecting said two pipes together, said collar being adapted to surround said second pipe in radial spaced relation, securing and tightening means for releasably securing said collar to the end flange of said first pipe, the flanged end of said first pipe having an axial recess in its front face, a sealing and insulating gasket carried in said recess, the radial width of a said recess being such as to snugly receive said gasket so as to position said gasket therein, the axial depth of said recess being greater than the thickness of the gasket, said gasket being interposed between the opposed flange faces of said pipes for sealing against leakage and for preventing electrical contact between said first and second pipes, said collar having an inner radial rim, a dielectric bushing preformed to have an axial portion and a radial flange, respectively interposed annularly between said second pipe and the radial rim of said retaining collar, and also between the radial rim of said collar and the adjacent rear surface of the flange of said second pipe, said retaining collar having a circular end rib on its front face opposed to front face of the flange of said first pipe, the outside diameter of said rib being smaller than the inside diameter of said recess in the end flange of said first pipe so as to provide for sliding engagement and alignment between the rib of said collar and said first pipe independently of said securing and tightening means and also to provide for engagement of said gasket by the rib of said collar upon tightening of said securing and tightening means for the purpose of sealing against leakage from the interior of said pipes, the peripheral surfaces of the flanges of said second pipe and said bushing and the inner surface of said rib being annularly spaced to provide a dielectric air gap therebetween.

5. A pipe union comprising in combination two pipes, one of which is of non-ferrous material and the other of which is of ferrous material, each of said pipes having an end flange which is adapted to be opposed to the other when in assembled position in said union, the opposite end of the non-ferrous pipe being provided with means for connection with non-ferrous tubing, or the like, the opposite end of said ferrous pipe being arranged for connection with ferrous tubing, or the like, a ferrous retaining collar for releasably connecting said two pipes together, said collar being adapted to surround said non-ferrous pipe in radial spaced relation, securing and tightening means for releasably securing said collar to the end flange of said ferrous pipe, the flanged end of said ferrous pipe having an axial recess in its front face, a sealing and insulating gasket carried in said recess, the radial width of said recess being such as to snugly receive said gasket so as to position said gasket therein, the axial depth of said recess being greater than the thickness of the gasket, said gasket being interposed between the opposed flange faces of said pipes for sealing against leakage and for preventing electrical contact between said ferrous and non-ferrous pipes, said collar having an inner radial rim, a dielectric bushing preformed to have an axial portion and a radial flange, respectively interposed annularly between said non-ferrous pipe and the radial rim of said retaining collar, and also between the radial rim of said collar and the adjacent rear surface of the flange of said non-ferrous pipe, said retaining collar having a circular end rib on its front face opposed to the front face of the flange of said ferrous pipe, the outside diameter of said rib being smaller than the inside diameter of said recess in the end flange of the ferrous pipe so as to provide for sliding engagement and alignment between the rib of said collar and said ferrous pipe independently of said securing and tightening means and also to provide engagement of said gasket by the rib of said collar upon tightening of said securing and tightening means for the purpose of sealing against leakage from the interior of said pipes, the peripheral surfaces of the flanges of said non-ferrous pipe and said bushing and the inner surface of said rib being annularly spaced to provide a dielectric air gap therebetween.

ROY C. PURKHISER.

References Cited in the file of this patent

UNITED STATES PATENTS

| Number | Name | Date |
|---|---|---|
| 373,452 | Gennert | Nov. 22, 1887 |
| 426,121 | Gennert | Apr. 22, 1890 |
| 626,143 | Clift | May 30, 1899 |
| 689,455 | Bickford | Dec. 24, 1901 |
| 1,983,228 | Hall | Dec. 4, 1934 |
| 2,148,036 | Pfefferle | Feb. 21, 1939 |
| 2,234,119 | Halliburton | Mar. 4, 1941 |